United States Patent
Lu

(10) Patent No.: US 12,531,823 B2
(45) Date of Patent: Jan. 20, 2026

(54) BUSINESS SERVICE INTERACTION METHOD AND APPARATUS, DEVICE, AND STORAGE MEDIUM

(71) Applicant: BEIJING YOUZHUJU NETWORK TECHNOLOGY CO., LTD., Beijing (CN)

(72) Inventor: Shaoxun Lu, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 83 days.

(21) Appl. No.: 18/551,756

(22) PCT Filed: Mar. 4, 2022

(86) PCT No.: PCT/CN2022/079359
§ 371 (c)(1),
(2) Date: Sep. 21, 2023

(87) PCT Pub. No.: WO2022/206287
PCT Pub. Date: Oct. 6, 2022

(65) Prior Publication Data
US 2024/0177200 A1 May 30, 2024

(30) Foreign Application Priority Data
Mar. 30, 2021 (CN) .......................... 202110341256.9

(51) Int. Cl.
*H04L 51/046* (2022.01)
*G06F 3/0482* (2013.01)
(Continued)

(52) U.S. Cl.
CPC .......... *H04L 51/046* (2013.01); *G06F 3/0482* (2013.01); *G06F 3/0484* (2013.01); *H04L 63/083* (2013.01)

(58) Field of Classification Search
CPC ... H04L 51/046; H04L 63/083; G06F 3/0482; G06F 3/0484
See application file for complete search history.

(56) References Cited

U.S. PATENT DOCUMENTS

2004/0267942 A1 12/2004 Maes
2012/0274725 A1 11/2012 Robertson
(Continued)

FOREIGN PATENT DOCUMENTS

CN 102710759 A 10/2012
CN 103248561 A 8/2013
(Continued)

OTHER PUBLICATIONS

International Search Report (with English translation) and Written Opinion issued in PCT/CN2022/079359, dated May 26, 2022, 10 pages provided.
(Continued)

*Primary Examiner* — Nicholas Ulrich
(74) *Attorney, Agent, or Firm* — Astute IP Law Group

(57) ABSTRACT

Provided are a business service interaction method and apparatus, a device, and a storage medium. The method includes in response to determining that an instant messaging application account is not bound to a second account of a second application, displaying a received binding reminder page on a current interface, where the binding reminder page includes a binding jump button; in response to detecting a click operation performed by a user on the binding jump button, controlling the current interface to jump to a binding information page, where the binding information page includes information about at least one second account and a binding button; and in response to detecting a click operation performed by the user on the binding button,
(Continued)

completing binding between the instant messaging application account and the at least one second account.

16 Claims, 7 Drawing Sheets

(51) Int. Cl.
*G06F 3/0484* (2022.01)
*H04L 9/40* (2022.01)

(56) References Cited

U.S. PATENT DOCUMENTS

| | | | |
|---|---|---|---|
| 2016/0291844 A1* | 10/2016 | Lai | G06Q 20/10 |
| 2017/0116161 A1 | 4/2017 | Stein et al. | |
| 2022/0058037 A1* | 2/2022 | Ye | H04L 63/08 |
| 2022/0103552 A1* | 3/2022 | Jiang | G06Q 20/102 |
| 2022/0327536 A1* | 10/2022 | Wu | G06F 9/547 |

FOREIGN PATENT DOCUMENTS

| | | |
|---|---|---|
| CN | 103763182 A | 4/2014 |
| CN | 103856332 A | 6/2014 |
| CN | 105024975 A | 11/2015 |
| CN | 105956495 A | 9/2016 |
| CN | 107733653 A | 2/2018 |
| CN | 108200089 A | 6/2018 |
| CN | 108390818 A | 8/2018 |
| CN | 109126142 A | 1/2019 |
| CN | 109787934 A | 5/2019 |
| CN | 113079085 A | 7/2021 |
| WO | 2015023306 A1 | 2/2015 |

OTHER PUBLICATIONS

Chinese Office Action, issued in Chinese patent application No. 202110341256.9, dated May 25, 2022, 12 pages (translation enclosed).

* cited by examiner

BUSINESS SERVICE INTERACTION METHOD AND APPARATUS, DEVICE, AND STORAGE MEDIUM

CROSS-REFERENCE TO RELATED APPLICATIONS

This is a National Stage Application, filed under 35 U.S.C. 371, of International Patent Application No. PCT/CN2022/079359, filed on Mar. 4, 2022, which claims priority to Chinese Patent Application No. 202110341256.9 filed with the China National Intellectual Property Administration (CNIPA) on Mar. 30, 2021, the disclosures of which are incorporated herein by reference in their entireties.

TECHNICAL FIELD

Embodiments of the present disclosure relate to the field of computer technologies, for example, a business service interaction method and apparatus, a device, and a storage medium.

BACKGROUND

With the rapid development of the live e-commerce industry, live shopping has become an important lifestyle when people do shopping. As a brand-new important carrier between products and users, hosts play an increasingly important role. The hosts may feed back various questions to merchants through instant messaging software and conduct corresponding consultations. At present, industry operators use instant messaging software to communicate with the merchants and hosts for information transmission and service. However, due to human reasons, the communication efficiency is relatively low and cannot satisfy the use experience of merchants and hosts.

SUMMARY

Embodiments of the present disclosure provide a business service interaction method and apparatus, a device, and a storage medium, so as to help a merchant and a host solve problems and release operational pressure by accessing a smart business service.

An embodiment of the present disclosure provides a business service interaction method. The business service interaction method includes the steps described below.

In response to determining that an instant messaging application account is not bound to a second account of a second application, a received binding reminder page is displayed on the current interface, where the binding reminder page includes a binding jump button.

In response to detecting that a user performs a click operation on the binding jump button, the current interface is controlled to jump to a binding information page, where the binding information page includes information about at least one second account and a binding button.

In response to detecting that the user performs a click operation on the binding button, the instant messaging application account is bound to the at least one second account.

An embodiment of the present disclosure also provides a business service interaction apparatus. The business service interaction apparatus includes a binding reminder page display module, a binding information page jump module, and an account binding module.

The binding reminder page display module is configured to, in response to determining that an instant messaging application account is not bound to a second account of a second application, display a received binding reminder page on a current interface, where the binding reminder page includes a binding jump button.

The binding information page jump module is configured to, in response to detecting that a user performs a click operation on the binding jump button, control the current interface to jump to a binding information page, where the binding information page includes information about at least one second account and a binding button.

The account binding module is configured to, in response to detecting that the user performs a click operation on the binding button, complete binding between the instant messaging application account and the at least one second account.

An embodiment of the present disclosure provides an electronic device. The electronic device includes one or more processing apparatuses and a storage apparatus.

The storage apparatus is configured to store one or more programs.

When executed by the one or more processing apparatuses, the one or more programs cause the one or more processing apparatuses to perform the business service interaction method according to the embodiments of the present disclosure.

An embodiment of the present disclosure discloses a computer-readable medium storing a computer program which, when executed by a processing apparatus, causes the processing apparatus to perform the business service interaction method according to the embodiments of the present disclosure.

DETAILED DESCRIPTION

Embodiments of the present disclosure are described in more detail hereinafter with reference to the drawings. The drawings illustrate some embodiments of the present disclosure, but it is to be understood that the present disclosure may be implemented in various manners and should not be construed as being limited to the embodiments set forth herein. On the contrary, these embodiments are provided to facilitate a more thorough and complete understanding of the present disclosure. It is to be understood that the drawings and embodiments of the present disclosure are merely illustrative and are not intended to limit the scope of the present disclosure.

It is to be understood that steps described in method embodiments of the present disclosure may be performed in a different order and/or in parallel. Additionally, the method embodiments may include additional steps and/or omit some of the illustrated steps. The scope of the present disclosure is not limited in this respect.

As used herein, the term "include" and variations thereof are intended to be inclusive, that is, "including, but not limited to". The term "based on" is "at least partially based on". The term "one embodiment" means "at least one embodiment"; the term "another embodiment" means "at least one another embodiment"; and the term "some embodiments" means "at least some embodiments". Definitions of other terms are given in the description hereinafter.

It is to be noted that references to "first", "second" and the like in the present disclosure are merely intended to distinguish one from another apparatus, module, or unit and are not intended to limit the order or interrelationship of the functions performed by the apparatus, module, or unit.

It is to be noted that references to modifications of "one" or "a plurality" mentioned in the present disclosure are intended to be illustrative and not limiting, and that those skilled in the art should understand that "one" or "a plurality" should be understood as "one or more" unless clearly expressed in the context.

The names of messages or information exchanged between apparatuses in the embodiments of the present disclosure are only used for illustrative purposes and are not intended to limit the scope of the messages or information.

Figure 1:
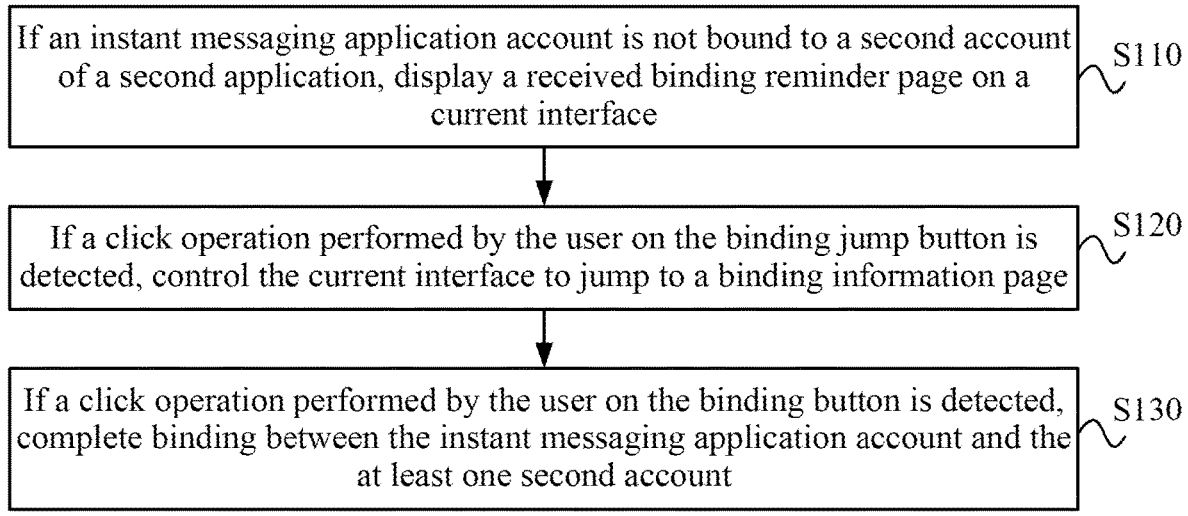
FIG. 1 is a flowchart of a business service interaction method according to an embodiment of the present disclosure.

FIG. 1 is a flowchart of a business service interaction method according to an embodiment of the present disclosure. The method may be performed by a business service interaction apparatus. The apparatus may be composed of hardware and/or software and generally integrated into a device with a business service interaction function. The device may be an electronic device such as a server, a mobile terminal, or a server cluster. As shown in FIG. 1, the method includes the steps described below.

In step 110, if an instant messaging application account is not bound to a second account of a second application, a received binding reminder page is displayed on the current interface.

The binding reminder page includes a binding jump button. The binding reminder page may be displayed in the form of a message card, an applet page, or an H5 page. For example, an instant messaging application may be regarded as a first application, and the instant messaging application account may be regarded as a first account. The second application is an application other than the first application, and the second account is an account corresponding to another application other than the first account.

In this embodiment, to achieve the business service interaction, a client, an event monitoring center, and a server need to cooperate. The instant messaging application is installed in the client, the event monitoring center is used for monitoring a user event of the client, and the server is used for processing interaction logic and configuring the binding reminder page to the event monitoring center.

Figure 2A:
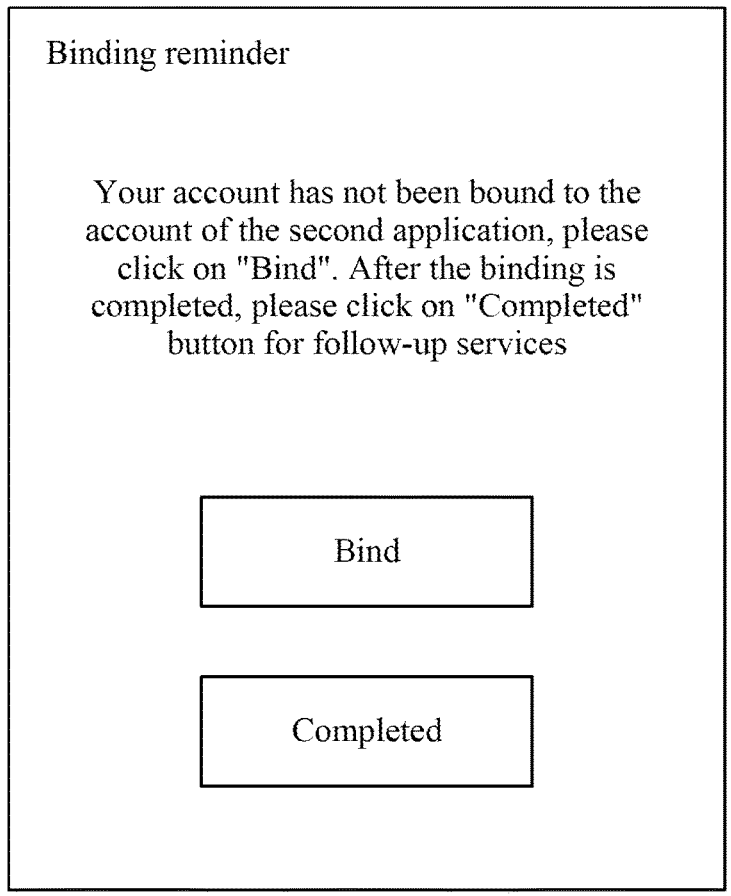
FIG. 2A is an example diagram of a binding reminder page according to an embodiment of the present disclosure.

For example, a user logs in to the instant messaging application through the client, and if the event monitoring center detects that the instant messaging application account is not bound to the second account of the second application, the event monitoring center sends the binding reminder page to the client. When receiving the binding reminder page, the client displays the binding reminder page on the current interface. For example, FIG. 2A is an example diagram of a binding reminder page. As shown in FIG. 2A, the binding reminder page includes reminder information and the binding jump button, and the reminder information reminds the user to perform page jumping by clicking on the binding jump button.

In step 120, if it is detected that the user performs a click operation on the binding jump button, the current interface is controlled to jump to a binding information page.

The binding information page includes information about at least one second account and a binding button. In this application scenario, the second application may be an e-commerce application or a live broadcast application, and the second account may be a host account or a merchant account registered in the second application. The second account and the instant messaging application account belong to the same user and are associated with each other through a user identification code, such as an identification card or a mobile phone number.

Figure 2B:
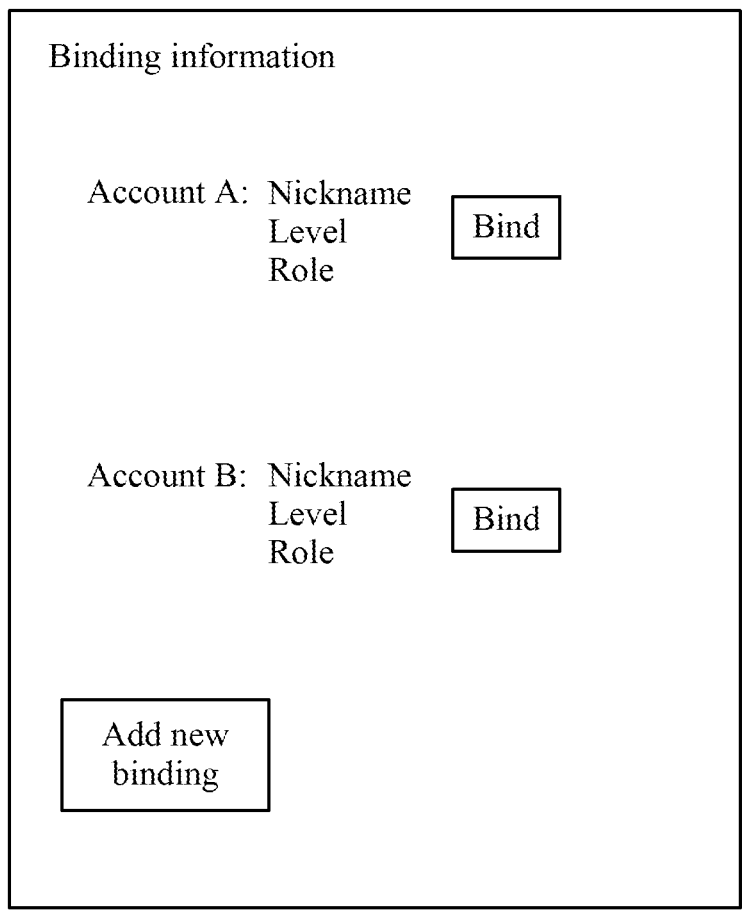
FIG. 2B is an example diagram of a binding information page according to an embodiment of the present disclosure.

For example, if the click operation performed by the user on the binding jump button is detected, when detecting the click operation of the user, the event monitoring center acquires the user identification code carried by the instant messaging application account, acquires at least one second account from the server based on the user identification code, generates the binding information page based on the information about the at least one second account, and sends the binding information page to the client so that the current interface of the client jumps from the binding reminder page to the binding information page. For example, FIG. 2B is an example diagram of a binding information page according to an embodiment of the present disclosure. As shown in FIG. 2B, the information about account A and account B and the binding buttons are included, and the user clicks on the binding button to perform binding on account A and account B.

In step 130, if it is detected that the user performs a click operation on the binding button, the instant messaging application account is bound to the at least one second account.

In this embodiment, if the user clicks on the binding button, the instant messaging application account is bound to the second account, and the binding button becomes an unbinding button. When the user no longer needs the binding, the user may click on the unbinding button to be unbound to the second account.

For example, the binding information page also includes a new addition button. If a click operation performed by the user on the new addition button is detected, the current interface is controlled to jump to an account login page; login information inputted by the user through an information input box is received, and when a click operation performed by the user on a login button is detected, binding between the instant messaging application account and a newly added second account is completed.

Figure 2C:
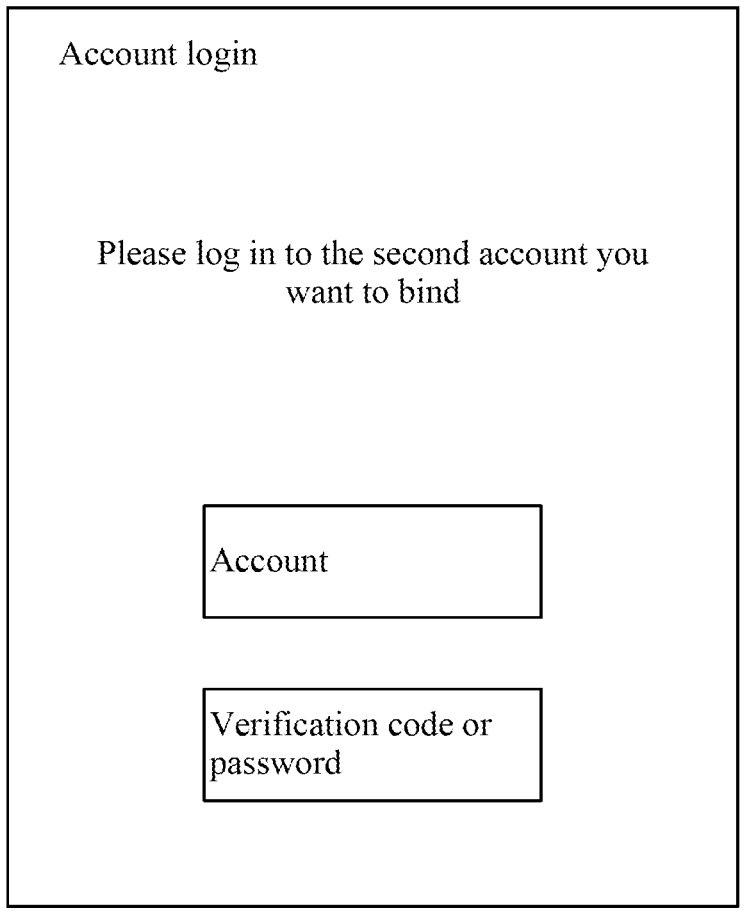
FIG. 2C is an example diagram of an account login page according to an embodiment of the present disclosure.

The account login page includes the information input box and a login button for the user to input information about a newly added second account so that the instant messaging application account is bound to the newly added second account. For example, FIG. 2C is an example diagram of an account login page. As shown in FIG. 2C, the account login page includes an account input box and a password or verification code input box. After the user inputs the account and a verification code, the instant messaging application account is bound to the newly added second account.

For example, after the instant messaging application account is bound to at least one second account, the method also includes the following steps: if the instant messaging application account is bound to one second account, a first account selection page is displayed on the current interface, the first account selection page includes the second account and a business service access button; and if a click operation performed by the user on the business service access button is detected, the current interface jumps to a business service page.

Figure 2D:
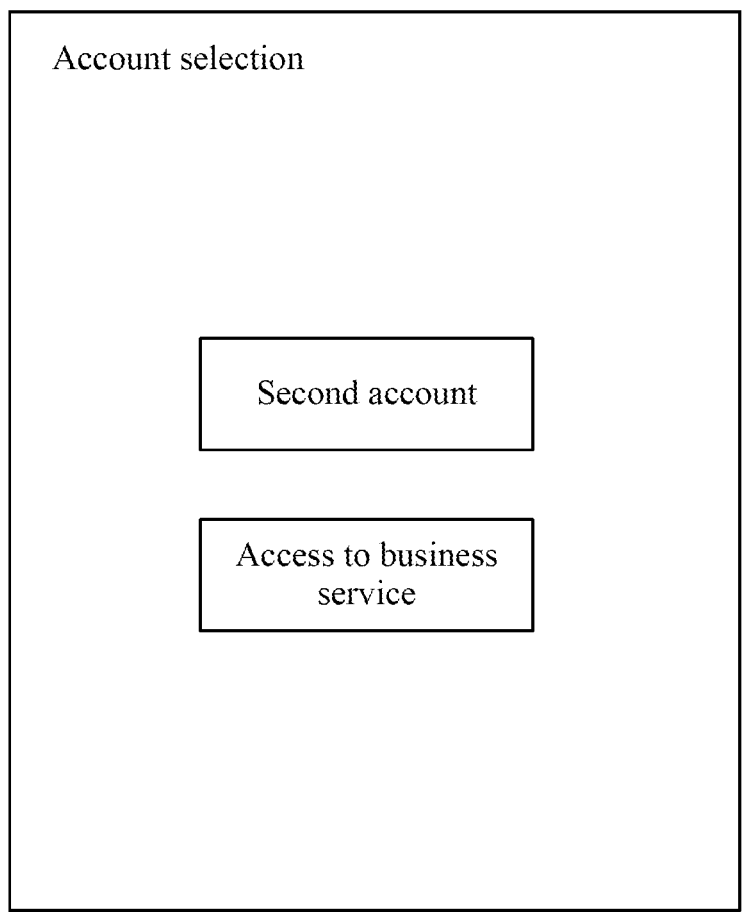
FIG. 2D is an example diagram of a first account selection page according to an embodiment of the present disclosure.

For example, FIG. 2D is an example diagram of a first account selection page according to an embodiment of the present disclosure. As shown in FIG. 2D, the second account bound to the instant messaging application account and the business service access button are displayed on the first account selection page. After the user clicks on the business service access button, the current interface jumps to the business service page so that the user can communicate with the smart business service.

For example, after the binding between the instant messaging application account and at least one second account, the method also includes the following steps: if the instant messaging application account is bound to two or more second accounts, a second account selection page is displayed on the current interface; a second account selected by the user from a second account list is determined, and when a click operation performed by the user on the business service access button is detected, a business service authentication process begins; and if the authentication is successful, the current interface jumps to the business service page.

The second account selection page includes the second account list and the business service access button.

Figure 2E:
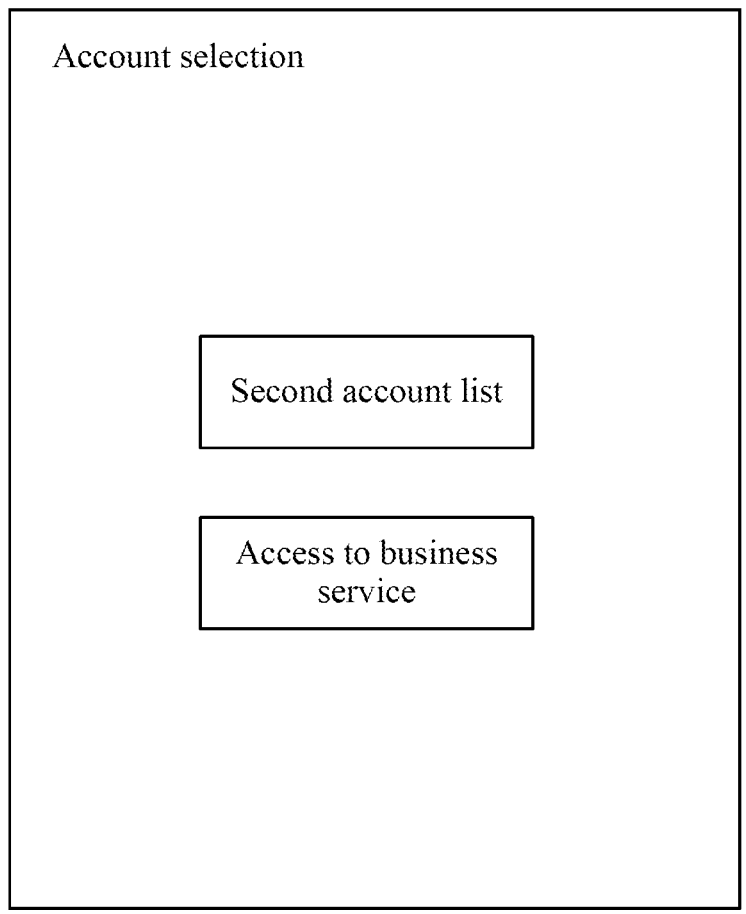
FIG. 2E is an example diagram of a second account selection page according to an embodiment of the present disclosure.

For example, FIG. 2E is an example diagram of a second account selection page according to an embodiment of the present disclosure. As shown in FIG. 2E, the second account list bound to the instant messaging application account and the business service access button are displayed on the second account selection page. After the user selects a second account from the second account list and clicks on the business service access button, the business service authentication process for the instant messaging application account begins. If the authentication is successful, the current interface jumps to the business service page so that the user can communicate with the smart business service.

In the technical schemes of the embodiments of the present disclosure, if the instant messaging application account is not bound to the second account of the second application, the received binding reminder page is displayed on the current interface, where the binding reminder page includes the binding jump button; if the click operation performed by the user on the binding jump button is detected, the current interface is controlled to jump to the binding information page, where the binding information page includes the information about at least one second account and the binding button; and if the click operation performed by the user on the binding button is detected, the instant messaging application account is bound to the at least one second account. In the business service interaction method provided in the embodiments of the present disclosure, the instant messaging application account is bound to at least one second account of the second application so that the user communicates with the business service through the instant messaging application, so as to help the merchant and the host solve problems and release operational pressure by accessing the smart business service.

Figure 3:
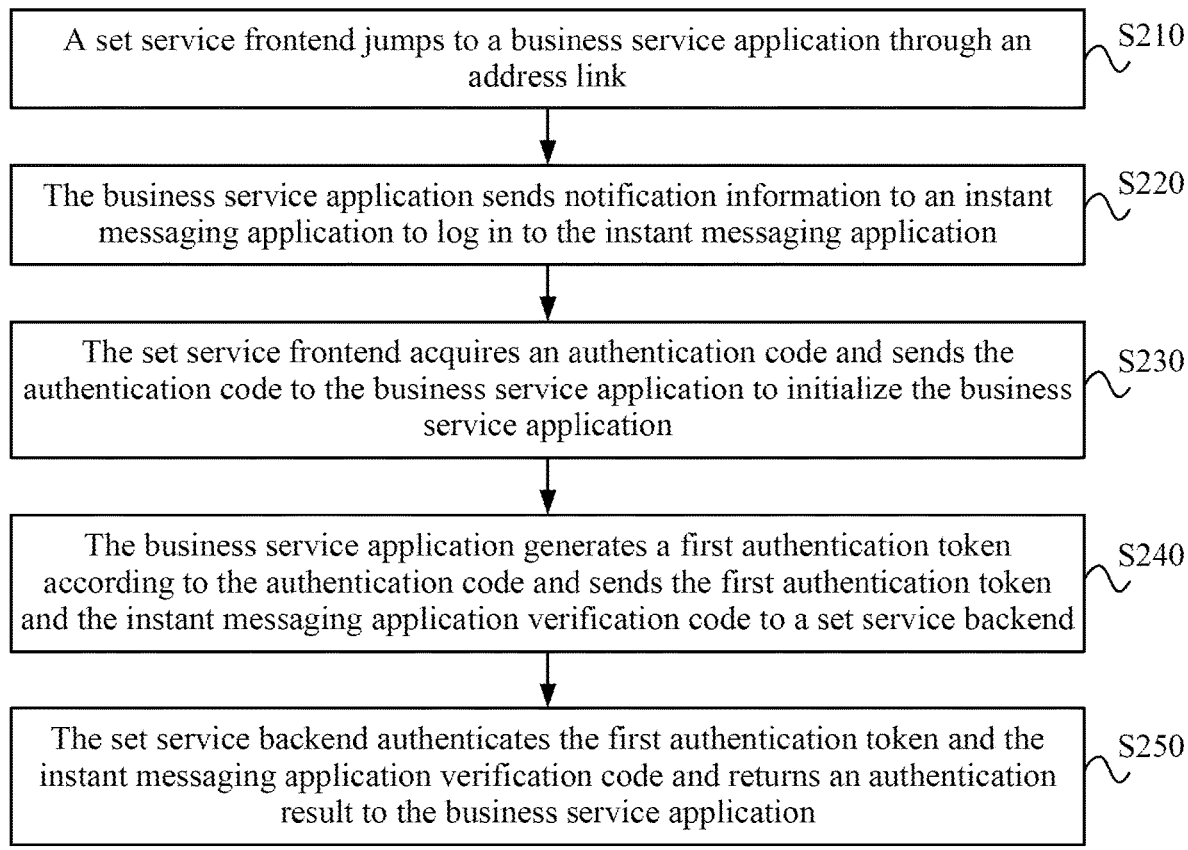
FIG. 3 is a flowchart of a method for business service authentication according to an embodiment of the present disclosure.

FIG. 3 is a flowchart of a method for business service authentication according to an embodiment of the present disclosure. As shown in FIG. 3, the method includes the steps described below.

In S210, a set service frontend jumps to a business service application through an address link.

A set service may be an e-commerce service, and the set service frontend may be displayed through a mobile terminal or a desktop personal computer (PC). The address link may be a hypertext transfer protocol (HTTP) link. In this embodiment, the user accesses the set service frontend through the PC or the mobile terminal, and then through the HTTP link, the set service frontend jumps to the page where the business service application is located.

In step 220, the business service application sends notification information to an instant messaging application to log in to the instant messaging application.

In step 230, the set service frontend acquires an authentication code and sends the authentication code to the business service application to initialize the business service application.

The authentication code includes an instant messaging application identification code, a business service channel identification code, a traffic identification code, and an instant messaging application verification code. The instant messaging application verification code may be an instant messaging application cookie, the instant messaging application identification code may be an instant messaging application identification (ID), the business service channel identification code may be a business service channel ID, and the traffic identification code may be a traffic ID (such as a host ID or a store ID).

For example, the process in which the set service frontend acquires the authentication code may be as follows: the set service backend acquires the instant messaging application verification code and sends the instant messaging application verification code to the set service frontend; and the set service frontend generates the authentication code based on the instant messaging application verification code, the instant messaging application identification code, the business service channel identification code, and the traffic identification code.

In this embodiment, after the instant messaging application is logged in, the set service backend acquires the instant messaging application cookie and sends the instant messaging application cookie to the set service frontend. The set service frontend sends the instant messaging application cookie, the instant messaging application ID, the business service channel ID, and the traffic ID to the business service application to initialize the business service application. In this embodiment, multiple authentication codes are used for authentication, thereby preventing attacks and ensuring confidentiality and integrity during data transmission.

In step 240, the business service application generates a first authentication token according to the authentication code and sends the first authentication token and the instant messaging application verification code to the set service backend.

The first authentication token may be tokenParam. In this embodiment, after the business service application is initialized, the first authentication token is generated according to the received instant messaging application cookie, instant messaging application ID, business service channel ID, and traffic ID, and the first authentication token and the instant messaging application cookie are sent to the set service backend.

In step 250, the set service backend authenticates the first authentication token and the instant messaging application verification code and returns an authentication result to the business service application.

The authentication result may be an authentication success or an authentication failure. After performing the authentication on the first authentication token and the instant messaging application cookie, the set service backend obtains the authentication result and sends the authentication result to the business service application so that the business service application performs a corresponding operation according to the authentication result.

For example, after the authentication result is returned to the business service application, the method also includes the steps described below. If the authentication result is a success, the business service application generates a business service uniform resource locator (URL) and a second authentication token; and the business service page is loaded onto an interface of the instant messaging application according to the URL and the second authentication token.

After the business service page is loaded onto the interface of the instant messaging application, the user may communicate with a smart customer through the instant messaging application, so as to help the merchant and the host solve problems and release operational pressure.

In this embodiment, if the authentication fails, information about the authentication failure is displayed on the business service page.

In the technical schemes of this embodiment, the set service frontend jumps to the business service application through the address link; the business service application sends the notification information to the instant messaging application to log in to the instant messaging application; the set service frontend acquires the authentication code and sends the authentication code to the business service application to initialize the business service application, the authentication code includes the instant messaging application identification code, the business service channel identification code, the traffic identification code, and the instant messaging application verification code; the business service application generates the first authentication token according to the authentication code and sends the first authentication token and the instant messaging application verification code to the set service backend; and the set service backend authenticates the first authentication token and the instant messaging application verification code and returns the authentication result to the business service application. Multiple authentication codes are used for authentication, thereby preventing attacks and ensuring the confidentiality and integrity during data transmission.

Figure 4:
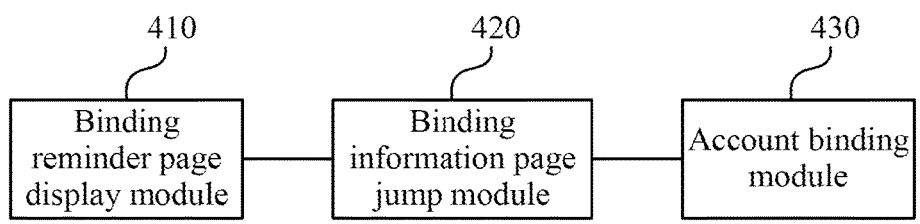
FIG. 4 is a structural diagram of a business service interaction apparatus according to an embodiment of the present disclosure.

FIG. 4 is a structural diagram of a business service interaction apparatus according to an embodiment of the present disclosure. As shown in FIG. 4, the apparatus includes a binding reminder page display module 410, a binding information page jump module 420, and an account binding module 430.

The binding reminder page display module 410 is configured to, when an instant messaging application account is not bound to a second account of a second application, display a received binding reminder page on a current interface, and the binding reminder page includes a binding jump button.

The binding information page jump module 420 is configured to, when it is detected that a user performs a click operation on the binding jump button, control the current interface to jump to a binding information page, and the binding information page includes information about at least one second account and a binding button.

The account binding module 430 is configured to, when it is detected that the user performs a click operation on the binding button, complete binding between the instant messaging application account and the at least one second account.

For example, the binding information page also includes a new addition button. The business service interaction apparatus also includes an account login page display module configured to:
  if a click operation performed by the user on the new addition button is detected, control the current interface to jump to the account login page, where the account login page includes an information input box and a login button; and
  receive login information inputted by the user through the information input box, and when a click operation performed by the user on the login button is detected, complete binding between the instant messaging application account and a newly added second account.

For example, the business service interaction apparatus also includes a first account selection page display module configured to:
  if the instant messaging application account is bound to one second account, display a first account selection page on the current interface, where the first account selection page includes the second account and a business service access button; and
  if a click operation performed by the user on the business service access button is detected, control the current interface to jump to a business service page.

For example, the business service interaction apparatus also includes a second account selection page display module configured to:
  if the instant messaging application account is bound to two or more second accounts, display a second account selection page on the current interface, where the second account selection page includes a second account list and a business service access button;
  determine a second account selected by the user from the second account list, and when a click operation performed by the user on the business service access button is detected, begins a business service authentication process; and
  if the authentication is successful, control the current interface to jump to a business service page.

For example, the business service interaction apparatus also includes a business service authentication module configured to:
  control a set service frontend to jump to a business service application through an address link; send notification information to an instant messaging application through the business service application to log in to the instant messaging application;
  acquire an authentication code through the set service frontend and send the authentication code to the business service application to initialize the business service application; where the authentication code includes an instant messaging application identification code, a business service channel identification code, a traffic identification code, and an instant messaging application verification code;
  generate a first authentication token through the business service application according to the authentication code and send the first authentication token and the instant messaging application verification code to the set service backend; and authenticate the first authentication token and the instant messaging application verification code through the set service backend and return an authentication result to the business service application.

For example, the business service authentication module is also configured to:

acquire the instant messaging application verification code through the set service backend and send the instant messaging application verification code to the set service frontend; and generate the authentication code through the set service frontend based on the instant messaging application verification code, the instant messaging application identification code, the business service channel identification code, and the traffic identification code.

For example, the business service interaction apparatus also includes a second authentication token generation module configured to:

when the authentication result is a success, generate a business service URL and a second authentication token through the business service application; and load the business service page onto an interface of the instant messaging application according to the URL and the second authentication token.

The preceding apparatus may perform the method provided in all of the preceding embodiments of the present disclosure and has function modules for and beneficial effects of executing the preceding method. For technical details that are not described in detail in the embodiment, reference may be made to the method provided in all of the preceding embodiments of the present disclosure.

Figure 5:
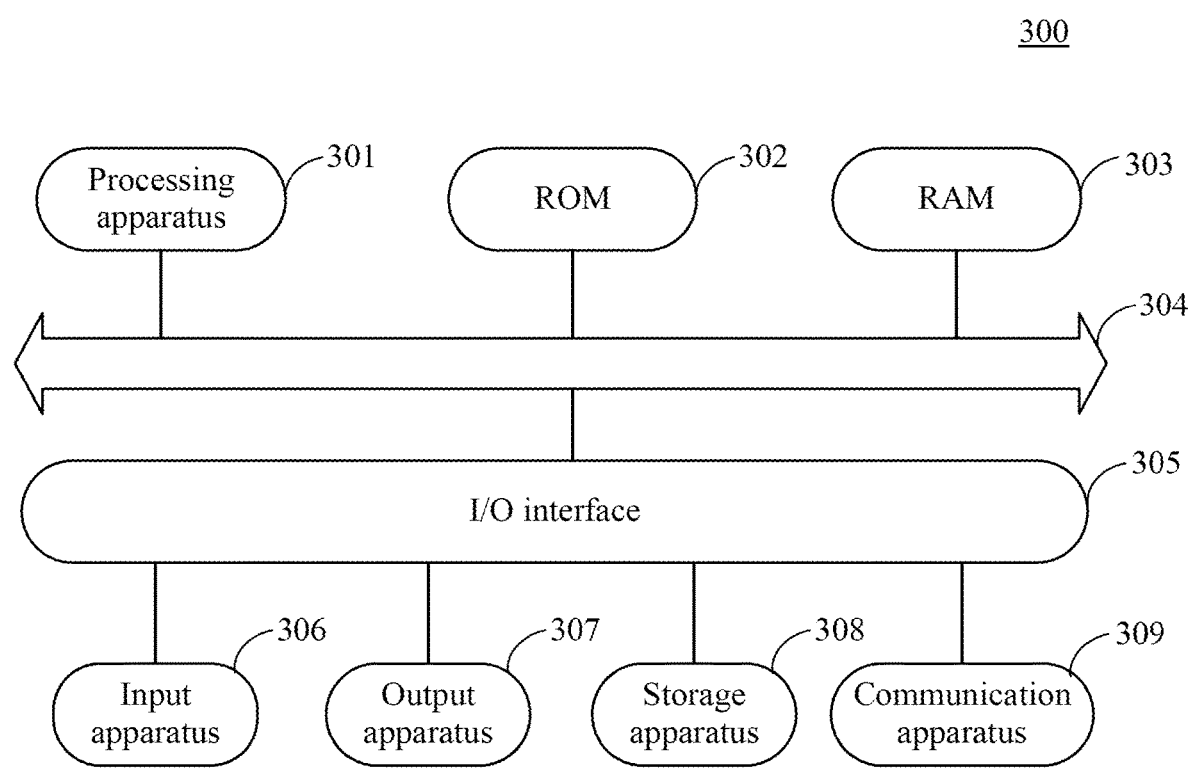
FIG. 5 is a structural diagram of an electronic device according to an embodiment of the present disclosure.

Referring to FIG. 5, FIG. 5 is a structural diagram of an electronic device 300 suitable for implementing the embodiments of the present disclosure. The electronic device in the embodiment of the present disclosure may include, but is not limited to, mobile terminals such as a mobile phone, a laptop, a digital broadcast receiver, a personal digital assistant (PDA), a PAD, a portable media player (PMP), and an in-vehicle terminal (such as an in-vehicle navigation terminal) and stationary terminals such as a digital television (TV) and a desktop computer, or various forms of servers such as an independent server or a server cluster. The electronic device shown in FIG. 5 is only an example and should not impose any limitation on the function and scope of use of the embodiments of the present disclosure.

As shown in FIG. 5, the electronic device 300 may include a processing apparatus 301 (such as a central processing unit and a graphics processing unit). The processing apparatus 301 may execute various types of appropriate operations and processing based on a program stored in a read-only memory (ROM) 302 or a program loaded from a storage apparatus 308 to a random-access memory (RAM) 303. Various programs and data necessary for the operation of the electronic device 300 are also stored in the RAM 303. The processing apparatus 301, the ROM 302, and the RAM 303 are connected to each other through a bus 304. An input/output (I/O) interface 305 is also connected to the bus 304.

Generally, the following apparatuses may be connected to the I/O interface 305: an input apparatus 306 such as a touch screen, a touchpad, a keyboard, a mouse, a camera, a microphone, an accelerometer, and a gyroscope; an output apparatus 307 such as a liquid crystal display (LCD), a speaker, and a vibrator; the storage apparatus 308 such as a magnetic tape and a hard disk; and a communication apparatus 309. The communication apparatus 309 may allow the electronic device 300 to perform wireless or wired communication with another device to exchange data. Although FIG. 5 illustrates the electronic device 300 having various apparatuses, it is to be understood that not all of the illustrated apparatuses are implemented or available. Alternatively, more or fewer apparatuses may be implemented.

For example, according to the embodiments of the present disclosure, the processes described above with reference to the flowcharts may be implemented as computer software programs. For example, the embodiments of the present disclosure include a computer program product. The computer program product includes a computer program carried in a computer-readable medium. The computer program includes program codes for performing a business service interaction method. In such an embodiment, the computer program may be downloaded and installed from a network via the communication apparatus 309, or may be installed from the storage apparatus 308, or may be installed from the ROM 302. When the computer program is executed by the processing apparatus 301, the preceding functions defined in the method according to the embodiments of the present disclosure are implemented.

It is to be noted that the preceding computer-readable medium in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus, or device, or any combination thereof. More specific examples of the computer-readable storage medium may include, but are not limited to, an electrical connection with one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical memory device, a magnetic memory device, or any appropriate combination thereof. In the present disclosure, the computer-readable storage medium may be any tangible medium including or storing a program. The program may be used by or in conjunction with an instruction execution system, apparatus, or device. In the present disclosure, the computer-readable signal medium may include a data signal propagated in the baseband or as part of a carrier wave, where computer-readable program codes are carried in the data signal. The data signal propagated in this manner may be in various forms, including, but not limited to, an electromagnetic signal, an optical signal, or any appropriate combination thereof. The computer-readable signal medium may also be any computer-readable medium other than the computer-readable storage medium. The computer-readable signal medium may send, propagate or transmit a program used by or in conjunction with an instruction execution system, apparatus, or device. The program codes included on the computer-readable medium may be transmitted via any appropriate medium including, but not limited to, an electrical wire, an optical cable, a radio frequency (RF), or any appropriate combination thereof.

In some embodiments, clients and servers may communicate using any network protocol currently known or developed in the future, such as the hypertext transfer protocol (HTTP) and may be interconnected with any form or medium of digital data communication (such as a communication network). Examples of the communication network include a local area network (LAN), a wide area network (WAN), an internet (such as the Internet), and a peer-to-peer network (such as an ad hoc network), as well as any network currently known or developed in the future.

The preceding computer-readable medium may be included in the preceding electronic device or may exist alone without being assembled into the electronic device.

The computer-readable medium carries one or more programs which, when executed by the electronic device, cause the electronic device to, in response to determining that an instant messaging application account is not bound to a second account of a second application, display a received binding reminder page on a current interface, where the binding reminder page includes a binding jump button; in response to detecting a click operation performed by a user on the binding jump button, control the current interface to jump to a binding information page, where the binding information page includes information about at least one second account and at least one binding button; and in response to detecting a click operation performed by the user on one of the at least one binding button, bind the instant messaging application account to the at least one second account.

Computer program codes for performing the operations in the present disclosure may be written in one or more programming languages or a combination thereof. The preceding one or more programming languages include, but are not limited to, object-oriented programming languages such as Java, Smalltalk, and C++, as well as conventional procedural programming languages such as C or similar programming languages. The program codes may be executed entirely on a user computer, executed partly on a user computer, executed as a stand-alone software package, executed partly on a user computer and partly on a remote computer, or executed entirely on a remote computer or a server. In the case where the remote computer is involved, the remote computer may be connected to the user computer via any type of network including a local area network (LAN) or a wide area network (WAN) or may be connected to an external computer (for example, via the Internet through an Internet service provider).

The flowcharts and block diagrams in the drawings illustrate possible architectures, functions, and operations of the system, method, and computer program product according to the embodiments of the present disclosure. In this regard, each block in the flowcharts or block diagrams may represent a module, a program segment, or part of codes. The module, program segment, or part of codes contains one or more executable instructions for implementing specified logical functions. It is also to be noted that in some alternative implementations, the functions marked in the blocks may be implemented in an order different from those marked in the drawings. For example, two successive blocks may, in fact, be performed substantially in parallel or in a reverse order, which depends on the functions involved. It is also to be noted that each block in the block diagrams and/or flowcharts and a combination of blocks in the block diagrams and/or flowcharts may be implemented by a specific-purpose hardware-based system which performs specified functions or operations or a combination of specific-purpose hardware and computer instructions.

The units involved in the embodiments of the present disclosure may be implemented by software or hardware. The name of a unit is not intended to limit the unit in a certain circumstance.

The functions described herein may be performed, at least partially, by one or more hardware logic components. For example, without limitations, example types of hardware logic components that may be used include: a field-programmable gate array (FPGA), an application-specific integrated circuit (ASIC), an application-specific standard product (ASSP), a system on a chip (SOC), a complex programmable logic device (CPLD), and the like.

In the context of the present disclosure, the computer-readable medium may be a tangible medium that may include or store a program used by or in conjunction with an instruction execution system, apparatus, or device. The computer-readable medium may be a computer-readable signal medium or a computer-readable storage medium. The computer-readable medium may include, but is not limited to, an electronic, magnetic, optical, electromagnetic, infrared, or semiconductor system, apparatus, or device, or any appropriate combination thereof. Concrete examples of the computer-readable storage medium include an electrical connection based on one or more wires, a portable computer disk, a hard disk, a RAM, a ROM, an erasable programmable read-only memory (EPROM), a flash memory, an optical fiber, a portable compact disc read-only memory (CD-ROM), an optical storage device, a magnetic storage device, or any appropriate combination thereof. For example, the computer-readable storage medium may be a non-transitory computer-readable storage medium.

According to one or more embodiments of the present disclosure, a business service interaction method is disclosed and includes the steps described below.

In response to determining that an instant messaging application account is not bound to a second account of a second application, a received binding reminder page is displayed on a current interface, where the binding reminder page includes a binding jump button.

In response to detecting a click operation performed by a user on the binding jump button, the current interface is controlled to jump to a binding information page, where the binding information page includes information about at least one second account and a binding button.

In response to detecting a click operation performed by the user on of the binding button, the instant messaging application account is bound to the at least one second account.

For example, the binding information page also includes a new addition button.

In response to detecting a click operation performed by the user on the new addition button, the current interface is controlled to jump to an account login page, where the account login page includes an information input box and a login button.

Login information inputted by the user through the information input box is received, and when a click operation performed by the user on the login button is detected, the instant messaging application account is bound to a newly added second account.

For example, after the instant messaging application account is bound to the at least one second account, the method also includes the steps described below.

In response to determining that the instant messaging application account is bound to one second account, a first account selection page is displayed on the current interface, where the first account selection page includes the one second account and a business service access button.

In response to detecting a click operation performed by the user on the business service access button, the current interface jumps to a business service page.

For example, after the instant messaging application account is bound to the at least one second account, the method also includes the steps described below.

In response to determining that the instant messaging application account is bound to two or more second accounts, a second account selection page is displayed on the current interface, where the second account selection page includes a second account list and a business service access button.

A second account selected by the user from the second account list is determined, and when a click operation performed by the user on the business service access button is detected, a business service authentication process begins.

In response to determining that the authentication is successful, the current interface jumps to a business service page.

For example, a method for business service authentication is described below.

A set service frontend jumps to a business service application through an address link.

The business service application sends notification information to an instant messaging application to log in to the instant messaging application.

The set service frontend acquires an authentication code and sends the authentication code to the business service application to initialize the business service application, where the authentication code includes an instant messaging application identification code, a business service channel identification code, a traffic identification code, and an instant messaging application verification code.

The business service application generates a first authentication token according to the authentication code and sends the first authentication token and the instant messaging application verification code to a set service backend.

The set service backend authenticates the first authentication token and the instant messaging application verification code and returns an authentication result to the business service application.

For example, the step in which the set service frontend acquires the authentication code includes the steps described below.

The set service backend acquires the instant messaging application verification code and sends the instant messaging application verification code to the set service frontend.

The set service frontend generates the authentication code based on the instant messaging application verification code, the instant messaging application identification code, the business service channel identification code, and the traffic identification code.

For example, after the authentication result is returned to the business service application, the method also includes the steps described below.

In response to determining that the authentication result is a success, the business service application generates a business service URL and a second authentication token.

The business service page is loaded onto an interface of the instant messaging application according to the URL and the second authentication token.

What is claimed is:

1. A business service interaction method, comprising:
in response to determining that an instant messaging application account is not bound to a second account of a second application, displaying a received binding reminder page on a current interface, wherein the binding reminder page comprises a binding jump button;
in response to detecting a click operation performed by a user on the binding jump button, controlling the current interface to jump to a binding information page, wherein the binding information page comprises information about at least one second account and at least one binding button corresponding to the at least one second account; and
in response to detecting a click operation performed by the user on the at least one binding button, completing binding between the instant messaging application account and the at least one second account;
wherein after completing the binding between the instant messaging application account and the at least one second account, the method further comprises:
in response to determining that the instant messaging application account is bound to at least two second accounts, displaying a second account selection page on the current interface, wherein the second account selection page comprises a second account list and a business service access button;
determining a second account selected by the user from the second account list, and when a click operation performed by the user on the business service access button is detected, entering a business service authentication process; and
in response to determining authentication being successful, controlling the current interface to jump to a business service page; and
wherein the business service page is used for communication between the user and a smart customer.

2. The method of claim 1, wherein the binding information page further comprises a new addition button, and the method comprises:
in response to detecting a click operation performed by the user on the new addition button, controlling the current interface to jump to an account login page, wherein the account login page comprises an information input box and a login button; and
receiving login information inputted by the user through the information input box, and when a click operation performed by the user on the login button is detected, completing binding between the instant messaging application account and a newly added second account.

3. The method of claim 1, wherein after completing the binding between the instant messaging application account and the at least one second account, the method further comprises:
in response to determining that the instant messaging application account is bound to one second account, displaying a first account selection page on the current interface, wherein the first account selection page comprises the one second account and a business service access button; and
in response to detecting a click operation performed by the user on the business service access button, controlling the current interface to jump to a business service page.

4. The method of claim 1, wherein a method for business service authentication comprises:
controlling a set service frontend to jump to a business service application through an address link;
sending, by the business service application, notification information to an instant messaging application to log in to the instant messaging application;
acquiring, by the set service frontend, an authentication code and sending the authentication code to the business service application to initialize the business service application, wherein the authentication code comprises an instant messaging application identification code, a business service channel identification code, a traffic identification code, and an instant messaging application verification code;

generating, by the business service application, a first authentication token according to the authentication code and sending the first authentication token and the instant messaging application verification code to a set service backend; and authenticating, by the set service backend, the first authentication token and the instant messaging application verification code and returning an authentication result to the business service application.

5. The method of claim 4, wherein acquiring, by the set service frontend, the authentication code comprises:

acquiring, by the set service backend, the instant messaging application verification code and sending the instant messaging application verification code to the set service frontend; and generating, by the set service frontend, the authentication code based on the instant messaging application verification code, the instant messaging application identification code, the business service channel identification code, and the traffic identification code.

6. The method of claim 4, wherein after returning the authentication result to the business service application, the method for business service authentication further comprises:

in response to determining that the authentication result is successful, generating, by the business service application, a business service uniform resource locator (URL) and a second authentication token; and loading the business service page onto an interface of the instant messaging application according to the URL and the second authentication token.

7. A non-transitory computer-readable medium storing a computer program which, when executed by a processing apparatus, causes the processing apparatus to perform the business service interaction method of claim 1.

8. The computer-readable medium of claim 7, wherein the binding information page further comprises a new addition button, and the processing apparatus is caused to further perform:

in response to detecting a click operation performed by the user on the new addition button, controlling the current interface to jump to an account login page, wherein the account login page comprises an information input box and a login button; and receiving login information inputted by the user through the information input box, and when a click operation performed by the user on the login button is detected, completing binding between the instant messaging application account and a newly added second account.

9. The computer-readable medium of claim 7, wherein after completing the binding between the instant messaging application account and the at least one second account, the processing apparatus is caused to further perform:

in response to determining that the instant messaging application account is bound to one second account, displaying a first account selection page on the current interface, wherein the first account selection page comprises the one second account and a business service access button; and in response to detecting a click operation performed by the user on the business service access button, controlling the current interface to jump to a business service page.

10. The computer-readable medium of claim 7, wherein a method for business service authentication comprises:

controlling a set service frontend to jump to a business service application through an address link;

sending, by the business service application, notification information to an instant messaging application to log in to the instant messaging application;

acquiring, by the set service frontend, an authentication code and sending the authentication code to the business service application to initialize the business service application, wherein the authentication code comprises an instant messaging application identification code, a business service channel identification code, a traffic identification code, and an instant messaging application verification code;

generating, by the business service application, a first authentication token according to the authentication code and sending the first authentication token and the instant messaging application verification code to a set service backend; and authenticating, by the set service backend, the first authentication token and the instant messaging application verification code and returning an authentication result to the business service application.

11. An electronic device, comprising:
at least one processing apparatus; and
a storage apparatus configured to store at least one program;
wherein when executed by the at least one processing apparatus, the at least one program causes the at least one processing apparatus to perform the following:

in response to determining that an instant messaging application account is not bound to a second account of a second application, displaying a received binding reminder page on a current interface, wherein the binding reminder page comprises a binding jump button;

in response to detecting a click operation performed by a user on the binding jump button, controlling the current interface to jump to a binding information page, wherein the binding information page comprises information about at least one second account and at least one binding button corresponding to the at least one second account; and in response to detecting a click operation performed by the user on the at least one binding button, completing binding between the instant messaging application account and the at least one second account;

wherein after completing the binding between the instant messaging application account and the at least one second account, the at least one processing apparatus is caused to further perform:

in response to determining that the instant messaging application account is bound to at least two second accounts, displaying a second account selection page on the current interface, wherein the second account selection page comprises a second account list and a business service access button;

determining a second account selected by the user from the second account list, and when a click operation performed by the user on the business service access button is detected, entering a business service authentication process; and in response to determining authentication being successful, controlling the current interface to jump to a business service page; and wherein the business service page is used for communication between the user and a smart customer.

12. The electronic device of claim 11, wherein the binding information page further comprises a new addition button, and the at least one processing apparatus is caused to further perform:

in response to detecting a click operation performed by the user on the new addition button, controlling the current interface to jump to an account login page, wherein the account login page comprises an information input box and a login button; and receiving login information inputted by the user through the information input box, and when a click operation performed by the user on the login button is detected, completing binding between the instant messaging application account and a newly added second account.

13. The electronic device of claim 11, wherein after completing the binding between the instant messaging application account and the at least one second account, the at least one processing apparatus is caused to further perform:

in response to determining that the instant messaging application account is bound to one second account, displaying a first account selection page on the current interface, wherein the first account selection page comprises the one second account and a business service access button; and in response to detecting a click operation performed by the user on the business service access button, controlling the current interface to jump to a business service page.

14. The electronic device of claim 11, wherein a method for business service authentication comprises:

controlling a set service frontend to jump to a business service application through an address link;

sending, by the business service application, notification information to an instant messaging application to log in to the instant messaging application;

acquiring, by the set service frontend, an authentication code and sending the authentication code to the business service application to initialize the business service application, wherein the authentication code comprises an instant messaging application identification code, a business service channel identification code, a traffic identification code, and an instant messaging application verification code;

generating, by the business service application, a first authentication token according to the authentication code and sending the first authentication token and the instant messaging application verification code to a set service backend; and authenticating, by the set service backend, the first authentication token and the instant messaging application verification code and returning an authentication result to the business service application.

15. The electronic device of claim 14, wherein acquiring, by the set service frontend, the authentication code comprises:

acquiring, by the set service backend, the instant messaging application verification code and sending the instant messaging application verification code to the set service frontend; and generating, by the set service frontend, the authentication code based on the instant messaging application verification code, the instant messaging application identification code, the business service channel identification code, and the traffic identification code.

16. The electronic device of claim 14, wherein after returning the authentication result to the business service application, the method for business service authentication further comprises:

in response to determining that the authentication result is successful, generating, by the business service application, a business service uniform resource locator (URL) and a second authentication token; and loading the business service page onto an interface of the instant messaging application according to the URL and the second authentication token.

\* \* \* \* \*